UNITED STATES PATENT OFFICE.

JEAN DANYSZ, OF SEVRES, FRANCE.

METALLIC DERIVATIVES OF DIOXYDIAMINOARSENOBENZENE.

1,269,792.  Specification of Letters Patent.  Patented June 18, 1918.

No Drawing.  Application filed July 28, 1916.  Serial No. 111,941.

*To all whom it may concern:*

Be it known that I, JEAN DANYSZ, a citizen of the Republic of France, residing at Sevres, Seine-et-Oise, in the Republic of France, have invented certain new and useful Improvements in Metallic Derivatives of Dioxydiaminoarsenobenzene, of which the following is a specification.

It is known that compounds may be obtained from dioxydiaminoarsenobenzene hydrochlorid and various mercury salts but it is difficult to use these bodies especially therapeutically because they are but slightly soluble in acidulated water and decompose rapidly on adding soda.

According to the present invention, bodies are obtained which are more soluble and much more stable in a feebly alkaline solution. This object is achieved by treating the known products with antimony compounds, preferably so as to yield antimonyl compounds.

The products so obtained, have the great therapeutic advantage that they are appreciably more active and less toxic than the arsenobenzene compounds which have been subjected to experiment so far.

Example.

Mix 10 grams of dioxydiaminoarsenobenzene hydrochlorid ("606") dissolved in 100 c. c. of methyl alcohol as solvent with 4 grams of antimony chlorid dissolved in 4 c. c. of methyl alcohol and 1 gram of mercuric iodid dissolved in 90 c. c. of methyl alcohol. This gives a perfectly limpid cherry-red liquid from which can be precipitated by ether a yellowish-red powder of varying depth of color.

This powder has an acid reaction; it easily dissolves in water and in a slight excess of caustic soda.

The alkaline solution of this powder in methyl alcohol can be again precipitated by ether giving a sodium compound of dioxydiaminoarsenobenzene, mercuric iodid and antimonyl which is very easily soluble in water (up to 10%).

I declare that what I claim is:—

1. Process for the manufacture of a stable derivative of dioxydiaminoarsenobenzene by treating it with a mercury salt and an antimony salt.

2. Process for the manufacture of a stable derivative of dioxydiaminoarsenobenzene by treating it with a mercuric iodid and an antimony salt.

3. Process for the manufacture of a stable derivative of dioxydiaminoarsenobenzene by treating it with a mercury salt and an antimonious chlorid.

4. A stable derivative of dioydiaminoarsenobenzene containing mercury and antimonyl.

5. A stable sodium derivative of dioxydiaminoarsenobenzene containing mercuric idodid and the anitmonyl radical.

6. A stable derivative of dioxydiaminoarsenobenzene containing mercury and antimony.

In witness whereof I have hereunto signed my name this 24th day of June, 1916, in the presence of a subscribing witness.

JEAN DANYSZ.

Witness:
  CHAS. P. PRESSLY.